J. H. BAST.
AUTOMOBILE LOCK.
APPLICATION FILED SEPT. 26, 1919.
1,342,151. Patented June 1, 1920.
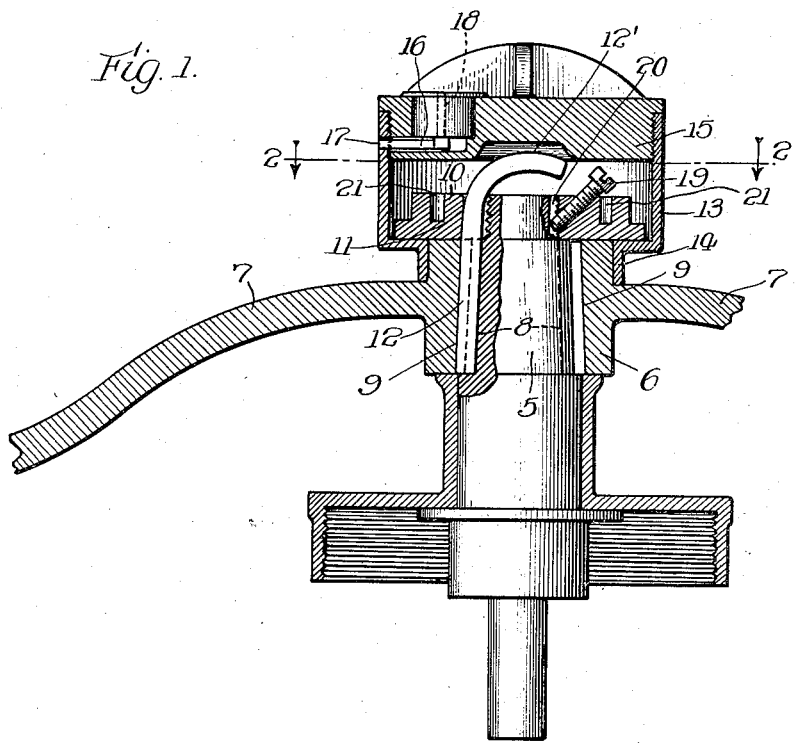
Witness:
A. J. Sauser.
Inventor:
Joseph H. Bast,
By Pond & Wilson,
Attys.

UNITED STATES PATENT OFFICE.

JOSEPH H. BAST, OF CHICAGO, ILLINOIS.

AUTOMOBILE-LOCK.

1,342,151.  Specification of Letters Patent.  Patented June 1, 1920.

Application filed September 26, 1919. Serial No. 326,594.

*To all whom it may concern:*

Be it known that I, JOSEPH H. BAST, a citizen of the United States, residing at Chicago, in the county of Cook and State of Illinois, have invented certain new and useful Improvements in Automobile-Locks, of which the following is a specification.

This invention relates to improvements in devices for preventing theft and unauthorized use of automobiles and other motor vehicles, and belongs to that type of automobile locks wherein theft or unauthorized use of the machine is prevented by rendering the steering gear inoperative. Safety devices of this class are principally of two kinds,—those wherein the steering wheel and post are locked against turning, and second, those wherein the steering wheel is locked and disconnected from the steering post so that it turns idly on the latter. The device of my prevent invention is of the last mentioned type, and the principal object of the invention is to provide an improved and simplified safety device of this character which may readily be applied to known and standard makes of automobiles without involving any alteration of the existing structure, and which shall be reliable and efficient for its intended purpose.

In the accompanying drawing, I have illustrated a simple embodiment of my invention as applied to the steering gear of a Ford car, and referring thereto—

Figure 1 is a vertical section through the upper end of the steering post and the hub of the steering wheel, showing my improvement applied thereto;

Fig. 2 is a horizontal section on the line 2—2 of Fig. 1; and

Fig. 3 is a perspective view of the removable key by which the steering wheel is operatively connected to the steering post.

Referring to the drawing, 5 designates the upper end portion of the steering post of a Ford car, on which is mounted the hub 6 of the steering wheel 7. In the standard Ford construction, the upper end of the steering post is formed with a pair of oppositely disposed vertical key-ways 8 which are adapted to register with similar key-ways 9 formed in the hub 6 of the steering wheel; and the wheel is operatively connected to the post by keys driven into the registering key-ways 8 and 9.

In accordance with my invention, I replace the usual nut on the upper end of the steering post which confines the hub of the steering wheel on the post, and substitute therefor a nut 10 which is formed with a vertical key-way slot 11 extending therethrough and adapted to be brought into alinement with one of the regular key slots 8, 9, of the post and hub. Through the key-way 11 and the registering key-ways 8 and 9 is passed a key 12 which preferably has an angularly bent handle 12′ forming a convenient handle by which the key may be entered and withdrawn by the thumb and finger of the user. When the key is in place, as shown in Fig. 1, the steering wheel is drivingly connected to the steering post.

It is obviously necessary, with the construction above described, to provide means for preventing the unauthorized withdrawal of the key 12, or the substitution of another similar key. For this purpose, I provide a simple means by which the key 12 can be locked against withdrawal or substitution by unauthorized persons. 13 designates a circular casing or housing having a contracted neck 14 at its lower end which is mounted on the upper end of the hub 6 of the steering wheel, and is locked in place by the nut 10, so that it cannot be removed without first removing the nut 10. This housing or casing 13 which entirely surrounds the nut 10 and the handle 12′ of the locking key, is provided with a closure that is itself locked to the casing or housing. This closure may take any suitable or desired form, but I have herein shown a screw cap 15 screwing into the upper end of the housing 13, and equipped with a radially sliding locking bolt 16 adapted to enter a hole or slot 17 formed in the side wall of the casing 13 when the cap has been screwed down into the casing. The bolt 16 may be manipulated by a suitable key entered through a key hole slot 18 in the screw cap.

In order to lock the nut 10 against turning on the upper end of the post when the key 12 is withdrawn, I preferably employ a locking screw 19 in the cap 10, the lower end of said screw being adapted to enter a vertical slot 20 in the upper threaded end of the post 5. This device is not essential, but is preferably employed to prevent accidental turning of the nut 10 when key 12 is withdrawn, and to always maintain the alinement of the key-ways 11 and 8 and 9. In the upper side of the nut 10 are formed a pair of sockets 21 to receive a spanner wrench when it is necessary to remove the nut 10. The manner of use and advantages of the described construction will be readily apparent from the foregoing description. When the owner or driver of the car has to leave the latter unguarded, he first unlocks the screw cap 15 by inserting a private key through the key hole 18 and retracting the locking bolt 16 and unscrewing the cap. He then manually withdraws the key 12 by grasping the handle 12' and lifting said key out of place. This breaks the driving connection of the steering wheel to the steering post, so that the former will only turn idly on the latter. The key 12, thus withdrawn, may be either laid within the casing 13 or pocketed by the driver, and the screw cap is then replaced in the housing and locked in place. This obviously makes it impossible for any one else to substitute another key similar to the key 12 so as to restore the steering gear to operative condition. When the driver or owner returns he unlocks and removes the screw cap, re-inserts the key 12 and then replaces and re-locks the screw cap.

The structure, uses and advantages of the invention will, it is believed, be entirely clear to those skilled in the art from the foregoing description. Manifestly, the described construction may be varied in details without departing from the principle of the invention or sacrificing any of the advantages thereof. Hence, I reserve all such variations and modifications as fall within the spirit and purview of the appended claims.

I claim—

1. In an automobile lock of the character described, the combination with a steering post, and a steering wheel revolubly mounted on said post, of removable means serving to key said wheel to said post, and a lock-controlled housing surrounding the upper end of said post and inclosing said removable means.

2. In an automobile lock of the character described, the combination with a steering post, and a steering wheel revolubly mounted on said post, of removable means serving to key said wheel to said post, a lock-controlled housing mounted on the hub of said wheel and inclosing said removable means, and means within said housing locking the same in place on said hub.

3. In an automobile lock of the character described, the combination with a steering post formed with a vertical key-way, and a steering wheel hub revolubly mounted on said post and formed with a vertical key-way adapted to be brought into register with the key-way of said post, of a key removably engaged with said key-ways and having an upwardly projecting handle portion, a lock-controlled housing mounted on said hub and inclosing the handle portion of said key, and means within said housing locking the same on said hub.

4. In an automobile lock of the character described, the combination with a steering post formed with a vertical key-way, and a steering wheel hub revolubly mounted on said post and formed with a vertical key-way adapted to be brought into sidewise register with the key-way of said post, of a nut on the upper end of said post formed with a slot adapted to be brought into endwise register with the upper ends of said key-ways, a key removably engaged with said slot and key-ways and having an upwardly projecting handle portion, and a lock-controlled housing mounted on said hub and inclosing said handle portion and nut and itself locked against removal by the latter.

5. In an automobile lock of the character described, the combination with a steering post formed with a vertical key-way, and a steering wheel hub revolubly mounted on said post and formed with a vertical key-way adapted to be brought into sidewise register with the key-way of said post, of a nut on the upper end of said post formed with a slot adapted to be brought into endwise register with the upper ends of said key-ways, a binding screw in said nut to lock the latter in a position in which its slot registers with said key-ways, a key removably engaged with said slot and key-ways and having a handle portion projecting above said nut, and a lock-controlled housing mounted on said hub and inclosing said handle portion and nut and itself locked against removal by the latter.

6. In an automobile lock of the character described, the combination with a steering post, and a steering wheel revolubly mounted on said post, said wheel and post being formed with registering key-ways, of a key engaged with said key-ways and having an upwardly projecting handle portion, a cup-shaped casing locked on the hub of said wheel and surrounding said handle portion, a cap or cover for said casing, and a lock securing said cap or cover in closed position.

JOSEPH H. BAST.